United States Patent [19]

Hirsch

[11] Patent Number: 5,597,273
[45] Date of Patent: Jan. 28, 1997

[54] DUAL DIRECTION COUNTERSINK

[75] Inventor: Mordechai Hirsch, Nahariya, Israel

[73] Assignee: Noga Engineering Ltd., Israel

[21] Appl. No.: 388,443

[22] Filed: Feb. 14, 1995

[30] Foreign Application Priority Data

Feb. 16, 1994 [IL] Israel ......................... 108659

[51] Int. Cl.$^6$ ......................................... B23B 51/00
[52] U.S. Cl. ........................................ 408/199; 408/227
[58] Field of Search ........................... 408/199, 227, 408/228, 231, 238, 239 R; 7/157

[56] References Cited

U.S. PATENT DOCUMENTS

| | | | |
|---|---|---|---|
| 2,276,771 | 3/1942 | Hawker | 408/227 |
| 2,448,385 | 8/1948 | Michela | 408/199 |
| 2,450,075 | 9/1948 | Bashara | 408/227 |
| 4,016,614 | 4/1977 | Press | 7/157 |

FOREIGN PATENT DOCUMENTS 2524340  12/1976  Germany ........................ 408/238

*Primary Examiner*—Daniel W. Howell
*Attorney, Agent, or Firm*—Brumbaugh, Graves, Donohue & Raymond

[57] ABSTRACT

A hand operated countersink has a shaft attached at one end to a cutting insert and at the other end to a handle, wherein said cutting insert is substantially of isosceles triangular shape. The insert has at least two cutting edges each disposed along an equal side of the triangle, one of the cutting edges being operative to cut when the shaft is rotated in one direction, and the other cutting edge being operative to cut when the shaft is rotated in the other direction. In a preferred embodiment, the insert has four cutting edges, two disposed along opposite edges of one equal side of the triangle, and two disposed along opposite edges of the other equal side of the triangle.

5 Claims, 2 Drawing Sheets

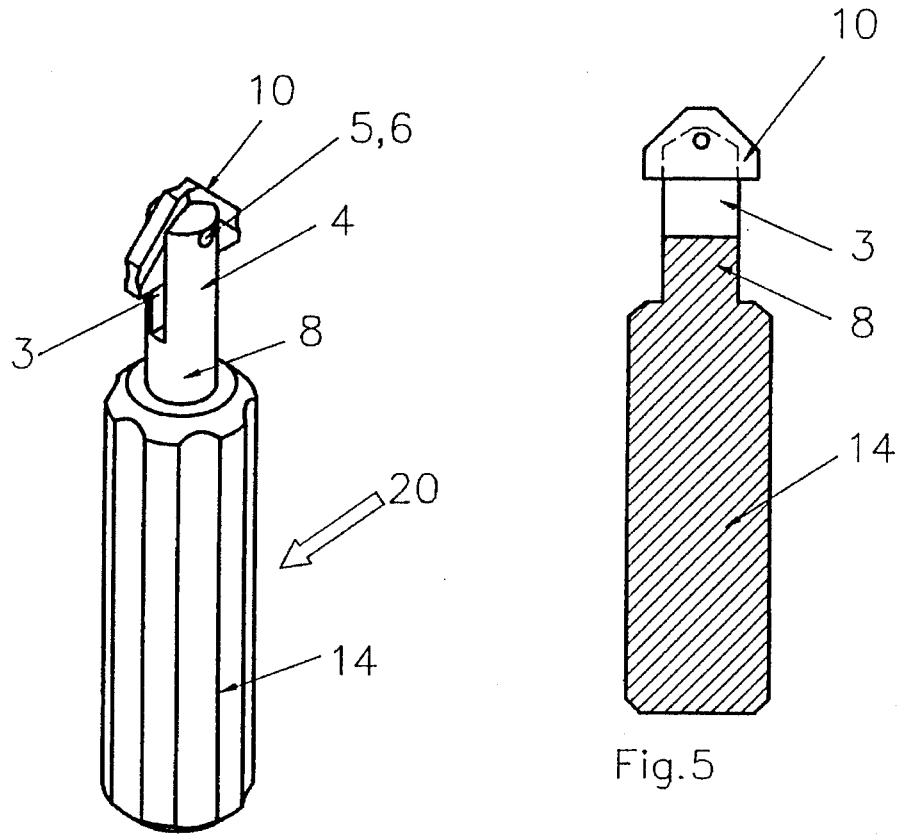
Fig. 4
Fig. 5
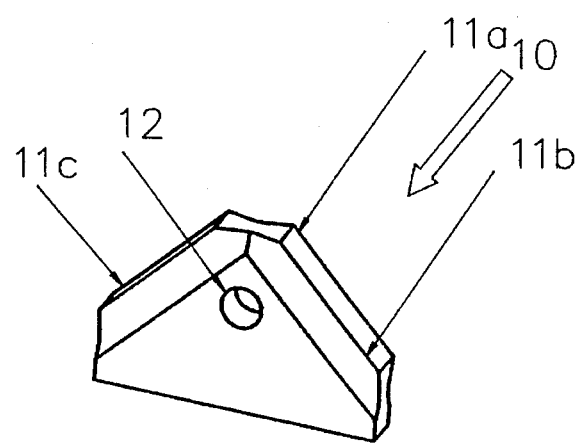
Fig. 6

DUAL DIRECTION COUNTERSINK

BACKGROUND OF THE INVENTION

The invention relates to a novel countersink. More particularly, the invention concerns a countersink which can operate in dual direction.

Countersinks are most commonly used in order to enlarge the outer end of a hole or cavity, in order to receive the head of a screw.

Another common use of countersinks, is to remove burrs formed on the rims of holes, while the hole is being formed by drilling or by other known means. Rims of holes formed in metal plates are easily accessible from both sides of the hole by known countersinks, which are substantially of conical shape with several cutting edges extending along the conical surface, having a relief angle therewith. The cutting edges in known conical countersinks are all facing same direction and therefore can cut while rotating in one direction only, which is a major disadvantage, since the operator has to move his wrist back and forth in order to accomplish the deburring by hand, thus the backward movement in known countersinks, does not contribute to the deburring.

It is the object of the present invention to provide for a hand operated countersink adapted to remove burrs from holes formed by drilling by both forward and backward circular motion of the tool.

BRIEF DESCRIPTION OF THE INVENTION

In accordance with the invention there is provided a hand operated countersink comprising a shaft attached at one end thereof to a substantially flat cutting insert provided with at least two cutting edges and at the other end thereof to a handle.

The cutting insert is substantially of isosceles triangular shape, optionally truncated, and preferably having four cutting edges substantially along the two ends of the two equal sides of the triangle.

BRIEF DESCRIPTION OF THE DRAWINGS

The invention is illustrated by way of example with reference to the accompanying drawings in which:

FIG. 4 is a perspective view of a another hand tool according to the invention.

FIG. 5 is a cross-sectional view of the hand tool shown in FIG. 4.

FIG. 6 is another perspective view of the cutting insert shown in FIGS. 4 and 5.

DETAILED DESCRIPTION OF THE INVENTION

Figure 1:
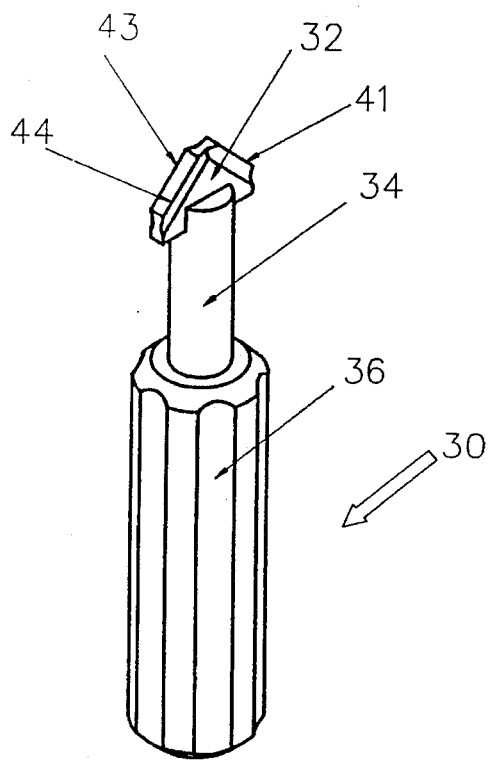
FIG. 1 is a perspective view of a hand tool according to the invention.
Figure 2:
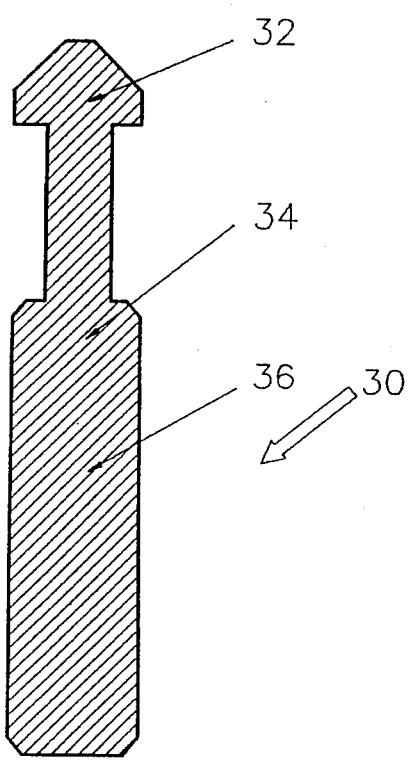
FIG. 2 is a cross-sectional view of the hand tool shown in FIG. 1.

Countersink 30 shown in FIGS. 1 and 2 comprises a cutting insert 32, a cylindrical shaft 34 provided with a central slot at one of its ends and a handle 36. Cutting insert is fixedly attached into the slot of shaft 34 by any conventional known means, such as welding, braising, gluing or pressing. The other end of the shaft is fixed into handle 36 by any conventional known means.

Figure 3:
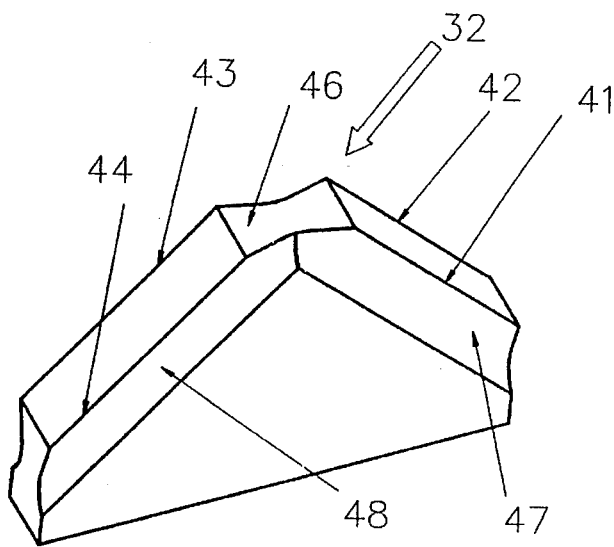
FIG. 3 is another perspective view of the cutting insert shown in FIGS. 1 and 2.

Cutting insert 32 shown in more detail in FIG. 3 is a flat insert of a substantially isosceles triangular shape having four cutting edges 41, 42, 43 and 44 along the two equal sides of the triangle. The triangle is truncated, forming a substantially flat surface 46, which allows utilization of the cutting insert for the deburring of holes, the diameter of which ranges between slightly smaller than the length of the base of the diameter and slightly larger than the length of surface 46. The width of the cutting insert is constant. Insert 32 is ground along the four cutting edges to form four cutting surfaces, two of them—47 and 48—are shown in figure. The cutting surfaces form rake angles which improve the cutting capabilities of the cutting edges, but are not essential.

In order to operate the countersink, such as for removal of burrs formed on rims of a worked hole, tool 30 is pushed against the rims of the hole so that all cutting edges 41 to 44 are touching the rims of the hole to be deburred an the tool is rotated by the hand of the operator a few times back and forth for approximately half a turn, while pressure is applied continuously. In the clockwise rotation cutting edges 42 and 44 are operating, while in the counterclockwise rotation cutting edges 41 and 43 are operating. Since tool 30 is a hand operated tool, it may be held in the hand, so that the tool is not absolutely perpendicular to the surface in which the deburred hole is located, but rather a slight wobble of the hand together with the tool is possible, so that when a clockwise rotation of the tool takes place, cutting edges 42 and 44 are slightly tilted away from the rim of the hole, whereas when a counterclockwise rotation of the tool takes place, cutting edges 41 and 43 are slightly reclined to prevent friction.

Countersink 32 can also be effective as a dual direction countersink if it has only two cutting edges, as long as one cutting edge is effective in the clockwise rotation and the other cutting edge is effective in the counterclockwise rotation. Suitable pairs of cutting edges for a cutting inserts under the invention are 41 and 44, 42 and 43, 41 and 42, or 43 and 44.

Countersink 20, shown in FIG. 4 comprises a cylindrical shaft 8, one end of said shaft is being inserted into a handle 14 by know fixing means. Longitudinal slot 3 located at the center of the other end of the shaft is of constant width forming two equal end parts 4, each provided with circular transverse holes 5, facing each other.

Cylindrical pin 6 having a length substantially equal to the diameter of shaft 8 and a diameter slightly smaller than the diameter of holes 5, is fixed into hole 5 to hold cutting insert 10.

Flat cutting insert 10, shown in more detail in FIG. 6, is substantially of isosceles triangular shape and has altogether four cutting edges 11 (three shown in figure), along the two ends of the two equal sides of the triangle. Transverse circular hole 12 runs through the center of cutting insert 10, having a diameter slightly larger than the diameter of pin 6.

In order to assemble tool 20 cutting insert 10 is placed in slot 3, so that the center of its transverse hole 12 is along a straight line with the centers of two holes 5 of shaft 8. Cylindrical pin 6 is then pushed into the three holes and press fitted into the shaft 8.

In assembled countersink 20, cutting insert 10 can freely rotate on pin 6, which serves as fulcrum.

The position of cutting insert 10 in tool 20, as shown in FIG. 4 and FIG. 5, is adapted to deburr ragged edges in the outer rim of a hole, facing the operator. Upon rotation of cutting insert 10 on pin 6, the cutting insert may assume other positions which allows the introduction of the cutting insert into a hole and the deburring of the inner rim of the hole, in particular, holes drilled in tubular parts.

For the deburring operation cutting insert 10 is placed on the rims of the hole and the operator has to rotate the handle a few times back and forth pushing the tool inwardly, against the rim of the hole, so that the cutting edges are pressed against the rim of the hole and the burrs are removed by the back and forth rotation of the countersink.

Due to the structure of cutting insert 10, wherein four cutting edges are available for the deburring operation—cutting edges 11b and 11d for the clockwise rotation and cutting edges 11a and 11c for the counterclockwise rotation—much effort is saved on behalf of the operator. Thus deburring takes place both in the clockwise and counterclockwise rotation, thereby utilizing the counterclockwise rotation for the deburring operation.

I claim:

1. A hand operated countersink comprising a shaft attached at one end to a cutting insert and at the other end to a handle, wherein said cutting insert is substantially of isosceles triangular shape, said insert having at least two cutting edges each disposed along an equal side of the triangle, said insert being ground along said cutting edges to form a rake angle, one of said cutting edges being operative to cut when the shaft is rotated in one direction, and the other cutting edge being operative to cut when the shaft is rotated in the other direction.

2. A hand operated countersink according to claim 1, wherein said insert has four said cutting edges, two disposed along opposite edges of one equal side of the triangle, and two disposed along opposite edges of the other equal side of the triangle, one of the cutting edges on each of the equal sides being operative to cut when the shaft is rotated in one direction, the other cutting edge on each of the equal sides being operative to cut when the shaft is rotated in the other direction.

3. A hand operated countersink according to claim 1, wherein the cutting insert is truncated.

4. A hand operated countersink according to claim 2, wherein the cutting insert is truncated.

5. A hand operated countersink according to claim 4, wherein the cutting insert is truncated.

\* \* \* \* \*